United States Patent
Oki et al.

(10) Patent No.: US 10,259,961 B2
(45) Date of Patent: Apr. 16, 2019

(54) INK JET TEXTILE PRINTING INK COMPOSITION, INK SET, AND PRINTING METHOD

(71) Applicant: Seiko Epson Corporation, Tokyo (JP)

(72) Inventors: Yasuhiro Oki, Matsumoto (JP); Hiroyuki Kaneko, Minowa (JP); Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 118 days.

(21) Appl. No.: 15/435,852

(22) Filed: Feb. 17, 2017

(65) Prior Publication Data

US 2017/0275485 A1    Sep. 28, 2017

(30) Foreign Application Priority Data

Mar. 24, 2016 (JP) ................. 2016-060187
Aug. 31, 2016 (JP) ................. 2016-169222

(51) Int. Cl.
| | | |
|---|---|---|
| C09D 11/328 | (2014.01) |
| D06P 5/30 | (2006.01) |
| C09B 62/09 | (2006.01) |
| C09D 11/54 | (2014.01) |
| D06P 1/06 | (2006.01) |
| C09B 33/10 | (2006.01) |

(52) U.S. Cl.
CPC ............. *C09D 11/328* (2013.01); *C09B 33/10* (2013.01); *C09B 62/09* (2013.01); *C09D 11/54* (2013.01); *D06P 1/06* (2013.01); *D06P 5/30* (2013.01)

(58) Field of Classification Search
CPC ....... C09D 11/30; C09D 11/54; C09D 11/328; C09B 62/09; D06P 1/06; D06P 5/30
See application file for complete search history.

(56) References Cited

U.S. PATENT DOCUMENTS

| | | | | |
|---|---|---|---|---|
| 4,560,480 A * | 12/1985 | Lacroix | ............... | C09B 62/08 210/638 |
| 6,203,888 B1 | 3/2001 | Aoki | | |
| 2003/0172840 A1* | 9/2003 | Blank | ............... | D06P 5/30 106/31.27 |
| 2014/0084578 A1 | 3/2014 | Yagi et al. | | |
| 2015/0171993 A1 | 6/2015 | Suzuka | | |

FOREIGN PATENT DOCUMENTS

| | | |
|---|---|---|
| CN | 105369652 A | 3/2016 |
| DE | 3623154 A1 | 1/1988 |
| EP | 0126830 A1 | 12/1984 |
| JP | H08-259866 A | 10/1996 |
| JP | H09-279488 A | 10/1997 |
| JP | 2011-084680 A | 4/2011 |
| JP | 2014-198816 A | 10/2014 |
| JP | 2015-119297 A | 6/2015 |

OTHER PUBLICATIONS

STIC Search Report dated Aug. 1, 2018.*
Extended European Search Report for Patent Application No. EP17162675.7 dated Jul. 11, 2017 (7 pages).

* cited by examiner

*Primary Examiner* — Eisa B Elhilo
(74) *Attorney, Agent, or Firm* — Harness, Dickey & Pierce, P.L.C.

(57) ABSTRACT

An ink jet textile printing ink composition according to the invention contains $Li^+$, $Na^+$, and a compound represented by the following formula (1):

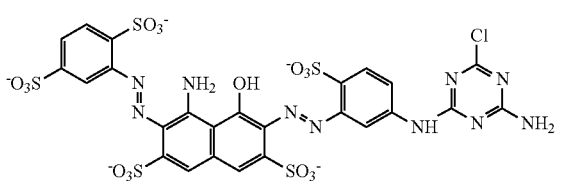

(1)

12 Claims, No Drawings

INK JET TEXTILE PRINTING INK COMPOSITION, INK SET, AND PRINTING METHOD

BACKGROUND

1. Technical Field

The present invention relates to an ink jet textile printing ink composition, an ink set including the ink composition, and a printing method using the ink set.

2. Related Art

For printing an image on a fabric or the like, there have been used textile printing methods such as screen printing, roller printing, rotary screen printing, and transfer printing. These textile printing methods are, however, not suitable for high-mix low-volume production in cost terms and are difficult to readily or rapidly respond to diversifying fashion trends because these methods require that an expensive screen frame, engraved roller, transfer paper, or the like be prepared every time the image design is changed.

In order to eliminate such disadvantages of the known textile printing methods, there has been developed an ink jet textile printing method (hereinafter may be referred to as ink jet textile printing) that is performed by reading a sample image with a scanner, processing the image with a computer, and printing the processed image by an ink jet printing method. Ink jet printing methods are a technique for forming a high-definition and high-quality image by ejecting droplets of an ink from an ink head onto a printing medium, such as paper or fabric, by a relatively simple and low-cost mechanism. By using such an ink jet printing method, high-tonality images can be rapidly formed without plate making required for the known textile printing. Accordingly, the ink jet printing method can shorten delivery time and can be applied to high-mix low-volume production, for example. Also, ink jet textile printing uses only an amount of ink required for forming the image intended and thus has environmental advantages in that, for example, waste ink can be reduced compared with the known textile printing such as screen printing.

Ink jet textile printing inks contain a dye, such as a direct dye, an acid dye, or a reactive dye. Reactive dyes are one of the newest dyes of history. Reactive dyes dye fabrics by a covalent bond that has the highest binding energy and is most stable of the linkages between fabrics and dyes, accordingly providing a significantly high wet color fastness. Also, reactive dyes enable dyeing in a wide range of hue from vivid color to deep color and are, accordingly, used for cellulose fabrics as the most consumed dye instead of direct dyes and acid dyes.

For example, JP-A-8-259866 describes an ink jet textile printing black ink that exhibits good color developability for cellulose fabrics and is resistant to clogging of the head. JP-A-2011-84680, JP-A-2015-119297, and JP-A-9-279488 each describe an ink jet textile printing black ink containing C.I. Reactive Black 39 (hereinafter may be referred to as RB 39) as a reactive dye for dyeing fabric black. JP-A-2014-198816 describes an ink jet printing dye ink that is black with good hue and can reduce bronze luster on printed articles.

However, RB 39 used in JP-A-2011-84680 is rather dark blue (a*<0) than black and is not good in black color developability. If the RB 39 content is increased to enhance the black color developability, the ink becomes likely to clog nozzles and thus hinders stable ejection of the ink. Also, if the RB 39 content is increased, the ink becomes likely to attack the material of the cartridge and flow channels of the printer when coming in contact therewith, thereby causing foreign matter to be generated.

Furthermore, if the RB 39 content is increased to enhance the black color developability, the optical density may reach the upper limit thereof, or the reproductivity of the black color may decrease (chroma C* increases). On the other hand, the market demands to adjust the tone of black to, for example, bluish black or reddish black. A technique for easily controlling the hue in an a* direction is desired.

SUMMARY

An advantage of some aspects of the invention is that it provides an ink jet textile printing ink composition that can be made with good color development when printed on fabric and that can be reliably ejected (for example, it can be stably ejected or enable recovery from clogging).

Another advantage of some aspects of the invention is that it provides an ink set and a printing method that can provide high color developability and exhibit high black color reproductivity when inks are printed on fabric, and that allow the black color to be easily adjusted.

The invention can be implemented as the following aspects or applications.

Application 1

An ink jet textile printing ink composition according to an aspect of the invention contains $Li^+$, $Na^+$, and a compound represented by the following formula (1):

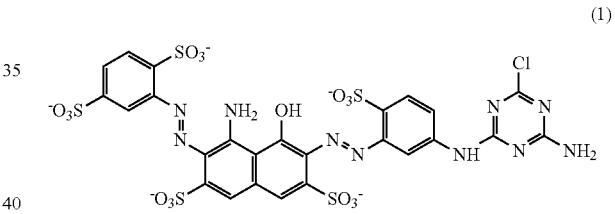

The ink jet textile printing ink composition contains not only $Na^+$, but also $Li^+$. This greatly increases the water solubility of the compound represented by formula (1). Accordingly, the content of the compound of formula (1) can be easily increased in the ink composition, and the ink composition thus can exhibit high color developability. More specifically, both when the cellulose fiber of cotton or hemp and the monochlorotriazine of the compound form a covalent bond and when polyamide fiber of silk or wool and the sulfo group of the compound form an ionic bond, the combination of $Li^+$ and $Na^+$ increases the probability of forming a linkage between the fiber and the binding group of the compound and thus provides high color developability, compared with the case of using only RB 39 that is a Na salt.

In addition, since the water solubility of the compound represented by formula (1) increases in the ink jet textile printing ink composition containing not only $Na^+$ but also $Li^+$, the compound of formula (1) attached and fixed to nozzles or the like can redissolve easily in water, and thus recovery from clogging becomes easy. Furthermore, the combination of $Na^+$ and $Li^+$ prevents the clogging (failure to supply ink) of the nozzles and flow channels with foreign matter derived from $Li^+$ and thus ensures stable ejection compared with the case of containing only $Li^+$.

Application 2

In the ink jet textile printing ink composition, the mole ratio of the compound of formula (1) to the Li$^+$ may be in the range of 1:0.4 to 1:3.5.

This ink jet textile printing ink composition can provide good color development when printed on fabric, and can also be more reliably ejected.

Application 3

In the ink jet textile printing ink composition, the compound may be represented by the following general formula (2):

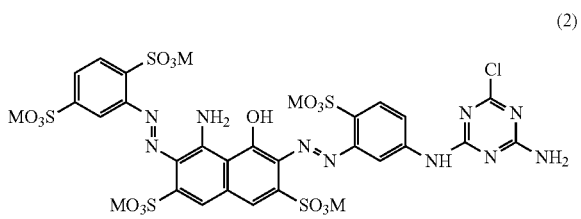

(2)

In this formula, each M represents a counter ion that is one of Na$^+$ and Li$^+$, and at least one of the five M's represents Li$^+$.

This ink jet textile printing ink composition can provide good color development when printed on fabric, can be more stably ejected, and enables easy recovery from clogging.

Application 4

In the ink jet textile printing ink composition, the content of the compound of formula (1) or a salt thereof may be 10% by mass or more relative to the total mass of the ink composition.

This ink jet textile printing ink composition can be a black ink with a good hue and provide good color development when printed on fabric.

Application 5

An ink set according to another aspect of the invention includes a first ink jet textile printing ink composition that is the above-described ink jet textile printing ink composition and a second ink jet textile printing ink composition that contains no Li$^+$.

The inks of an ink set consisting of Li$^+$-free ink jet textile printing ink compositions are not sufficiently redissolved in water. Accordingly, the inks attached and fixed to a cap (suction path) clog the cap, thus reducing suction power for cleaning, and as a result, recovery from clogging may be insufficient. On the other hand, in the use of the ink set including both the first ink jet textile printing ink composition that is the above-described ink jet textile printing ink composition and the second ink jet textile printing ink composition that is a Li$^+$-free ink jet textile printing ink composition, the first ink jet textile printing ink composition can be redissolved in water if it is fixed to the cap, and thus the clogging of the cap is eliminated. Since the suction power for cleaning is thus maintained, recovery from clogging is easy. For an ink set including a deep color ink, which tends to contain a large amount of coloring material, and a pale color ink, which tends to contain a small amount of coloring material, if the deep color ink contains Li$^+$ while the pale color ink is Li$^+$-free, the difference in recovery from clogging between the inks can be reduced, and accordingly, a common cap (suction path) can be used for cleaning.

Application 6

An ink set according to another aspect of the invention includes a first ink textile printing ink composition that is the above-described ink jet textile printing ink composition and a third ink jet textile printing ink composition containing a coloring material capable of adjusting the hue of the first ink composition in an a* direction.

In printing using a composite black including, in combination, the first ink jet textile printing ink composition and the third ink jet textile printing ink composition containing a coloring material capable of adjusting the hue in an a* direction, the quality (color developability, hue of black) of black images can be further improved with a hue in a wide range expanded in the a* direction, irrespective of what type of fabric (for example, silk or cotton) is used. The ink set enables the tone of black to be easily adjusted to, for example, bluish black or reddish black.

Application 7

In this ink set, the coloring material may be at least one selected from the group consisting of C.I. Reactive Orange 12, C.I. Reactive Orange 13, C.I. Reactive Red 3:1, C.I. Reactive Red 24, and C.I. Reactive Red 245.

By printing using a composite black with the ink set including such a magenta dye as the coloring material capable of adjusting the hue in an a* direction, the quality (color developability, hue of black) of black images can be particularly improved irrespective of what type of fabric (for example, silk or cotton) is used.

Application 8

According to still another aspect of the invention, a printing method uses the above-described ink set. The method includes printing, using a black color, a fabric with the ink set so that the proportion of the coloring material capable of adjusting the hue in an a* direction to a black dye is in the range of 0.2 to 0.8 in terms of solids content.

According to this printing method, in printing using a composite black including the coloring material capable of adjusting the hue in an a* direction and a black dye in a proportion in such a range, the quality (color developability, hue of black) of black images can be further improved, irrespective of what type of fabric (for example, silk or cotton) is used.

DESCRIPTION OF EXEMPLARY EMBODIMENTS

Preferred embodiments of the invention will now be described. The following embodiments will be described by way of example. The invention is not limited to the disclosed embodiments, and various modifications may be made within the scope and spirit of the invention.

1. Preparation of Ink Jet Textile Printing Ink Composition

The ink jet textile printing ink composition of an embodiment of the invention (hereinafter simply referred to as ink composition) contains Li$^+$, Na$^+$, and a compound represented by the following formula (1):

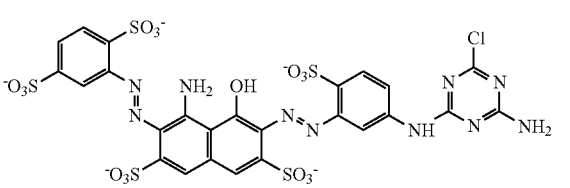

(1)

The ink composition of the present embodiment is an ink jet textile printing black ink. The compound represented by the formula (1) is a reactive dye exhibiting a hue from dark blue to black. The compound of the formula (1) in which all the counter ions are $Na^+$ is known as C.I. Reactive Black 39 (RB 39). The present inventors have found that the solubility of RB 39 in water is greatly increased by substituting $Li^+$ for some of the counter ions $Na^+$ of RB 39.

This effect allows the compound of the formula (1) to have an increased content in the ink composition, and accordingly, the ink composition can exhibit high color developability. More specifically, both when cellulose fiber of cotton or hemp and the monochlorotriazine of the compound form a covalent bond and when polyamide fiber of silk or wool and the sulfo group of the compound form an ionic bond, the ink composition can easily dye the fabric and, accordingly, provides more satisfactory color development than the case of using only RB 39, which is a Na salt of the compound of the formula (1).

Although the compound of the formula (1) clogs nozzles when adheres to the nozzles, the compound can be redissolved in water because the presence of $Li^+$ in the compound of the formula (1) greatly increases the water solubility of the compound and thus enables easy recovery from clogging. Furthermore, the clogging (failure to supply ink) of nozzles and flow channels with foreign matter is prevented to ensure stable ejection.

The ingredients in the ink composition of the present embodiment will now be described.

1.1. Reactive Dye

The ink composition of the present embodiment contains a compound represented by the formula (1) as a reactive dye. The ink composition also contains $Na^+$ and $L^+$:

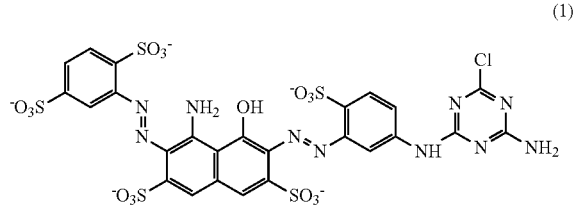

(1)

The ink composition may be prepared by one of the following two processes (a) and (b).

(a) Adding Compound Represented by General Formula (2) to Ink Composition:

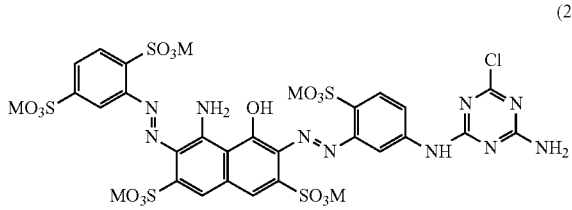

(2)

In general formula (2), each M represents a counter ion that is one of $Na^+$ and $Li^+$, and at least one of the five M's represents $Li^+$.

The ink composition of the present embodiment may be prepared by adding a compound represented by general formula (2) to an ink composition. If the reactive dye in the ink composition is composed of only the compound represented by general formula (2) in which all the five M's are $Li^+$, some constituent in the ink composition often attacks the ink cartridge and the flow channels of the printer when the ink comes in contact with such members, and a constituent dissolved out reacts with $Li^+$ to usually produce foreign matter. In this case, therefore, RB 39 or a compound that can act as a $Na^+$ source (herein after referred to as $Na^+$ source compound) is additionally added to the ink composition. Examples of the $Na^+$ source compound include sodium hydroxide, water-soluble sodium salts, such as sodium chloride, sodium sulfate, sodium bisulfate, and sodium benzoate, and other reactive dyes containing $Na^+$.

For most simply preparing the ink composition of the present embodiment, RB 39 and the compound of general formula (2) in which all the five M's are $Li^+$ are mixed. This method allows easy control of the proportions of the compound of formula (1) and the counter ions $Na^+$ and $Li^+$ in the ink composition, and can omit the step of additionally adding a $Li^+$ source compound.

(b) Adding $Li^+$ Source Compound to Ink Composition Containing RB 39

RB 39 is ionized into the ink compound represented by formula (1) and $Na^+$. The ink composition of the present embodiment may be prepared by adding a $Li^+$ source compound to the ink composition containing RB 39. Examples of the $Li^+$ source compound include lithium hydroxide, water-soluble lithium salts, such as lithium carbonate, lithium citrate, lithium chloride, lithium bromide, lithium iodide, lithium trifluoromethanesulfonate, lithium nonafluorobutanesulfonate, and disulfonic acid dilithium salt, and other reactive dyes containing $Li^+$.

If a $Li^+$ source compound, such as lithium hydroxide, is added to the ink composition of the present embodiment, the ink composition turns alkaline, and consequently, the triazine group of the compound of formula (1) can be decomposed to release the chlorine. Therefore, process (a) is preferred of the two.

The content of the compound of formula (1) or a salt thereof in the ink composition of the present embodiment is preferably, but is not limited to, 10% by mass or more, more preferably 10% by mass to 20% by mass, and still more preferably 12% by mass to 17% by mass. When the content of the compound of formula (1) in the ink composition or a salt thereof is in such a range, the ink composition can form black images with good color development on a fabric.

In the ink composition of the present embodiment, the mole ratio of the compound of formula (1) to $Li^+$ (of the compound of formula (1)) is preferably 1:0.4 to 1:3.5, more preferably 1:0.5 to 1:3.2, still more preferably 1:0.7 to 1:2. In the case of such a mole ratio, the water solubility of the compound of formula (1) tends to increase considerably, and the ink composition provides good color development when printed on a fabric, and exhibits good ejection reliability such as good ejection stability and satisfactory recovery from clogging.

Also, the mole ratio of $Na^+$ to $Li^+$ in the ink composition of the present embodiment is preferably 0.5:1 to 15:1, more preferably 2:3 to 9:1. In the case of such a mole ratio, the water solubility of the compound of formula (1) tends to increase considerably, and the ink composition provides good color development when printed on a fabric, and exhibits good ejection reliability such as good ejection stability and satisfactory recovery from clogging. The $Na^+$ and $Li^+$ contents in the ink composition of the present embodiment can be determined by ion chromatography.

The ink composition of the present embodiment may further contain another reactive dye other than the compound of formula (1). Examples of such a reactive dye include C.I. Reactive Yellows 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176; C.I. Reactive Oranges 1, 4, 5, 7, 11, 12, 13, 15, 16, 20, 30, 35, 56, 64, 67, 69, 70, 72, 74, 82, 84, 86, 87, 91, 92, 93, 95, 99, and 107; C.I. Reactive Reds 3:1, 2, 3, 5, 8, 11, 21, 22, 23, 24, 28, 29, 31, 33, 35, 43, 45, 49, 55, 56, 58, 65, 66, 78, 83, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, 235, and 245; C.I. Reactive Violets 1, 2, 4, 5, 6, 22, 23, 33, 36, and 38; C.I. Reactive Blues 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236; C.I. Reactive Greens 8, 12, 15, 19, and 21; C.I. Reactive Browns 2, 7, 9, 10, 11, 17, 18, 19, 21, 23, 31, 37, 43, and 46; and C.I. Reactive Blacks 5, 8, 13, 14, 31, and 34.

The optionally added reactive dye other than the compound of formula (1) is preferably at least one selected from the group consisting of C.I. Reactive Orange 12, C.I. Reactive Orange 13, C.I. Reactive Red 3:1, C.I. Reactive Red 24, and C.I. Reactive Red 245. In this instance, the ink composition creates a black color with good color development due to complementary color effect when printed on a fabric.

The total content of the reactive dyes in the ink composition of the present embodiment is preferably, but is not limited to 10% to 30% by mass, for example, and more preferably 12% to 24% by mass. Such an ink composition can be stably ejected and create a black color with good color development when printed on a fabric.

1.2. Water

The ink composition of the present embodiment may further contain water. The water acts as a dispersion medium in which the reactive dye disperses. Water in the ink composition adjusts the viscosity and surface tension of the ink composition to such appropriate levels that the ink composition can be still more reliably ejected by an ink jet method. Also, since water can be easily removed after the ink composition has been ejected by an ink jet technique, the productivity of printed products can be increased. In addition, water is very safe to the human body and the like. This is very important in ensuring workers' safety in production of printed products.

Preferably, the water is pure water or ultrapure water, such as ion exchanged water, ultrafiltered water, reverse osmotic water, or distilled water. Preferably, the water is sterilized by irradiating water with UV light or adding hydrogen peroxide. Such water prevents occurrence of mold and bacteria for a long term. The water content in the ink composition is preferably, but is not limited to, 50% to 90% by mass, and more preferably 55% to 80% by mass.

1.3. Water-Soluble Solvent

The ink composition of the present embodiment may contain a water-soluble solvent from the viewpoint of improving the stability thereof continuously ejected from the nozzles of the recording head of the ink jet printer. Examples of such a water-soluble solvent include alcohols, such as methanol, ethanol, and isopropyl alcohol; ketones and ketoalcohols, such as acetone and diacetone alcohol; ethers, such as tetrahydrofuran and dioxane; polyols, such as glycerin, ethylene glycol, diethylene glycol, triethylene glycol, polyethylene glycol, propylene glycol, dipropylene glycol, tripropylene glycol, polypropylene glycol, 1,2-propanediol, 1,2-butanediol, 1,2-pentanediol, hexylene glycol, 1,3-propanediol, 1,4-butanediol, 1,2-hexanediol, 1,5-pentanediol, 3-methyl-1,5-pentanediol, 1,6-hexanediol, 1,2,6-hexanetriol, and pentaerythritol; lower alkyl ethers of glycols, such as ethylene glycol monomethyl ether, diethylene glycol monomethyl ether, diethylene glycol monoethyl ether, diethylene glycol monobutyl ether, triethylene glycol monomethyl ether, triethylene glycol monobutyl ether; and lactams, such as 2-pyrrolidone, N-methyl-2-pyrrolidone, and ε-caprolactam. These water-soluble solvents may be used singly or in combination.

The water-soluble solvent content in the ink composition of the present embodiment is preferably in the range of 5% to 20% by mass, more preferably 8% to 18% by mass, and still more preferably 10% to 15% by mass from the viewpoint of preventing clogging of nozzles and bleeding.

1.4. Other Constituents

Surfactant

The ink composition of the present embodiment may contain a surfactant to increase ink permeability by increasing the wettability on fabric. Preferably, the surfactant is rather nonionic than ionic from the viewpoint of preventing the hindrance to binding of the compound of formula (1) to fabric because the compound of formula (1) is bound to fabric with an ionic bond.

Exemplary nonionic surfactants include ether-based surfactants, such as polyoxyethylene nonylphenyl ether, polyoxyethylene octylphenyl ether, polyoxyethylene dodecylphenyl ether, polyoxyethylene oleyl ether, polyoxyethylene lauryl ether, and other polyoxyethylene alkyl ethers; ester-based surfactants, such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycol- or acetylene alcohol-based surfactants, such as 2,4,7,9-tetramethyl-5-decyne-4,7-diol, 3,6-dimethyl-4-octyne-3,6-diol, and 3,5-dimethyl-1-hexyne-3-ol.

It is advantageous to use an acetylene glycol-based surfactant and/or an acetylene alcohol-based surfactant. The use of an acetylene glycol-based surfactant and/or an acetylene alcohol-based surfactant helps produce high-quality printed products in which bleeding is reduced.

Examples of the acetylene glycol-based surfactant and acetylene alcohol-based surfactant include Olfine series E1004, E1010, PD001, PD002W, and SPC and Surfynol series 104, 420, 440, 465, 485, and STG (each produced by Nissin Chemical Industry Co., Ltd); and Acetylenol series E00, E40, E100, and LH (each produced by Kawaken Fine Chemicals Co., Ltd).

These surfactants may be used singly or in combination. The surfactant content in the ink composition of the present embodiment is generally in the range of 0.05% to 3% by mass, and preferably in the range of 0.1% to 2% by mass.

Moisture Inducing Agent

The ink composition of the present embodiment may contain a moisture inducing agent. The moisture inducing agent in the ink composition helps induce moisture to fabric when steam treatment, which will be described later, is performed. Since the reactive dye follows the moisture, the resulting printed product exhibits uniform and good color development.

The moisture inducing agent may be urea or a urea derivative. The moisture inducing agent content in the ink composition of the present embodiment is preferably 0.5% to 10% by mass, and more preferably 1% to 5% by mass.

Other Additives

The ink composition of the present embodiment may further contain, if necessary, one or more of additives that can be generally used in ink jet textile printing inks, such as a fungicide, a preservative, an antioxidant, an ultraviolet absorbent, a chelating agent, an oxygen absorbent, a buffer, a pH adjuster (for example, a tertiary alkanolamine, such as triethanolamine or triisopropanolamine), and a solubilizing agent.

1.5. Preparation Process and Properties of Ink Composition

The ink composition of the present embodiment can be prepared by mixing the above-described ingredients in an order and, optionally, removing impurities by, for example, filtration. For mixing the ingredients, it is suitable to add the ingredients one after another into a container equipped with a stirring device, such as a mechanical stirrer or a magnetic stirrer, and stir the contents of the container.

Preferably, the ink composition of the present embodiment has a surface tension preferably in the range of 25 mN/m to 40 mN/m, more preferably in the range of 28 mN/m to 35 mN/m, from the viewpoint of the balance between the image quality and the reliability of the ink composition as an ink jet textile printing ink. From the same viewpoint, the ink composition has a viscosity preferably in the range of 1.5 mPa·s to 10 mPa·s, more preferably 2 mPa·s to 8 mPa·s, at 20° C. For controlling the surface tension and the viscosity in such ranges, for example, the type of the water-soluble solvent and surfactant and the content thereof and water may be appropriately controlled.

2. Ink Set

2.1. First Embodiment

The ink set according to a first embodiment includes a first ink jet textile printing ink composition that is the above-described ink jet textile printing ink composition and a second ink jet textile printing ink composition that contains no $Li^+$. The inks of an ink set consisting of $Li^+$-free ink jet textile printing ink compositions are not sufficiently redissolved in water. Accordingly, the inks attached and fixed to a cap (suction path) clog the cap, thus reducing suction power for cleaning, and as a result, recovery from clogging may be insufficient. On the other hand, in the use of the ink set including both the first ink jet textile printing ink composition that is the above-described ink jet textile printing ink composition and the second ink jet textile printing ink composition that is a $Li^+$-free ink jet textile printing ink composition, the first ink jet textile printing ink composition can be redissolved in water if it is fixed to the cap, and thus the clogging of the cap is eliminated. Since the suction power for cleaning is thus maintained, recovery from clogging is easy.

In the ink set according to the first embodiment, it is preferable that the reactive dye content in the first ink jet textile printing ink composition be higher than the reactive dye content in the second ink jet textile printing ink composition or $Li^+$-free ink composition. More specifically, a deep color ink, which tends to contain a large amount of dye in view of color developability, is desirably the first ink jet textile printing ink composition, while a pale color ink, which need not contain a large amount of dye, is desirably the second ink jet textile printing ink composition, from the viewpoint of increasing the degree of freedom in designing the ink composition.

If the content of the compound of formula (1) is high, nozzles are likely to be clogged. However, the first ink jet textile printing ink composition allows the compound of formula (1) to dissolve and redissolve in water due to the presence of $Li^+$. Accordingly, the first ink composition enables recovery from clogging even though it is a deep color ink. On the other hand, if the $Li^+$-free second ink jet textile printing ink composition is a pale color ink, it is unlikely to clog nozzles because the reactive dye content is low. Thus, in the use of the inks of the ink set, the nozzles of an ink jet recording apparatus including a common cap (suction path) for cleaning can recover from clogging with substantially no difference between the inks.

The second ink jet textile printing ink composition is the same as the first ink jet textile printing ink composition except for containing a $Li^+$-free reactive dye selected from the reactive dyes cited above.

2.2. Second Embodiment

The ink set according to a second embodiment includes a first ink jet textile printing ink composition that is the above-described $Li^+$-containing ink jet textile printing ink composition and a third ink jet textile printing ink composition containing a coloring material capable of controlling the hue of the first ink composition in an a* direction. The first ink jet textile printing ink composition is a black ink, but is rather bluish (a*<0). If the dye content is increased to improve the black color developability, the optical density tends to reach the upper limit thereof, or the reproductivity of the black color tend to decrease (chroma C* tends to increase). Accordingly, in printing using a composite black including, in combination, the first ink jet textile printing ink composition and the third ink jet textile printing ink composition containing a coloring material capable of adjusting the hue in an a* direction, the quality (color developability, hue of black) of black images can be further improved with a hue in a wide range expanded in the a* direction, irrespective of what type of fabric (for example, silk or cotton) is used. Since the use of the ink set of the second embodiment enables the adjustment of hue in an a* direction, the tone of a black color can be easily adjusted to, for example, bluish black or reddish black.

Examples of the coloring material capable of adjusting the hue in an a* direction include magenta dyes, such as C.I. Reactive Orange 12, C.I. Reactive Orange 13, C.I. Reactive Red 3:1, C.I. Reactive Red 24, and C.I. Reactive Red 245. C.I. Reactive Red 245 is particularly advantageous. By creating a composite black with the ink set using such a magenta dye as the coloring material capable of adjusting the hue in an a* direction, the quality (color developability, hue of black) of black images can be particularly improved irrespective of what type of fabric (for example, silk or cotton) is used in printing using the composite black.

The third ink jet textile printing ink composition is the same as the first ink jet textile printing ink composition except for containing a coloring material capable of the hue in an a* direction.

The ink set of the second embodiment may further include a yellow ink composition, a cyan ink composition, a blue ink composition, an orange ink composition, and a red ink composition without particular limitation as long as it includes the first ink jet textile printing ink composition and the third ink jet textile printing ink composition containing a coloring material capable of controlling the hue of the first ink composition in an a* direction.

3. Ink Jet Textile Printing Method

An ink jet textile printing method will now be described. In the ink jet textile printing method, a material such as fabric is dyed with the above-described ink jet textile printing ink composition according to an embodiment of the invention.

For example, an ink cartridge of an ink jet printer is charged with the ink jet textile printing ink composition, and this ink composition is ejected onto a material to be dyed. Textile printing is thus performed by the ink jet textile printing method. The ink jet printer may be, but is not limited to, of a drop-on-demand type. The drop-on-demand ink jet printer may adopt a piezoelectric recording technique using piezoelectric elements disposed in a recording head, a thermal jet recording technique using heaters of heat resistors disposed in a recording head, or other techniques, and any of these recording techniques may be used.

When a fabric is printed by the ink jet textile printing method, the fabric may be pretreated in advance with a pretreatment agent. For the pretreatment, the fabric may be immersed in the pretreatment agent, or the pretreatment agent is applied or sprayed to the fabric, followed by drying the fabric. The pretreatment agent may be an aqueous solution containing 0.01% to 20% by mass of a sizing agent that is a water-soluble polymer or the like and 1% to 5% by mass of an alkali generator.

Examples of the sizing agent include starches of corn, wheat or the like, cellulose such as carboxymethyl cellulose and hydroxymethyl cellulose, polysaccharides such as sodium alginate, gum arabic, locust bean gum, trant gum, guar gum, and tamarind seeds, protein such as gelatin and casein, water-soluble natural polymers such as tannin and lignin, and water-soluble synthetic polymers such as polyvinyl alcohol-based compounds, polyethylene oxide-based compounds, acrylic compounds, and maleic anhydride-based compounds. The alkali generator may be sodium hydrogencarbonate or sodium carbonate. The pretreatment agent may further contain a moisture inducing agent, such as urea or thiourea, a pH adjuster, an antireductant, a penetrant, a metal ion-blocking agent, an antifoaming agent, and other additives, if necessary.

For the ink jet textile printing method, the ink jet textile printing ink composition is ejected to a fabric (material to be dyed) to print characters and/or a pattern, and then the dye in the ink composition is fixed to the fabric or the like. For fixing the dye, a technique used in known textile printing methods may be applied, such as a technique using normal pressure steam or high pressure steam, or a thermally fixing technique. After the dye has been fixed, the fabric is washed with water and dried in the usual manner. Soaping treatment (washing out the unfixed dye with a heat soap solution or the like) may be performed, if necessary.

Examples of the fabric suitably used for ink jet textile printing include fabrics, knits, and nonwoven fabrics, each made of polyamide-based fiber or cellulose-based fiber. Examples of the cellulose-based fiber include cotton, hemp, rayon, Polynosic, cupra, and Lyocell. Examples of the polyamide-based fiber include silk, wool, and nylon.

In the ink jet textile printing method using the ink set of the second embodiment, the proportion of the coloring material capable of controlling the hue in an a* direction to the black dye is preferably in the range of 0.2 to 0.8 in terms of solids content in printing using a black color. More preferably, the proportion of the coloring material capable of controlling the hue in an a* direction to the black dye is in the range of 0.24 to 0.63, still more preferably in the range of 0.3 to 0.6. According to this textile printing method, in printing using a composite black including the coloring material and a black dye in a proportion in such a range, the quality (color developability, hue of black) of the black images thus formed is further improved with a hue in a wide range expanded in the a* direction, irrespective of what type of fabric (for example, silk or cotton) is used.

If the ink compositions of an ink set have complementary colors to each other, in general, a hue-adjusting dye is further added and, hence, the total dye content is increased. Consequently, the risk of nozzle clogging or ejection failure increases. In the case of the ink jet textile printing method using the ink set according to the above-described second embodiment, however, since the first ink jet textile printing ink composition is used, the compound of formula (1) fixed to nozzles or other portions can be redissolved in water, and thus the clogging of the nozzles can be reduced. Furthermore, the clogging (failure to supply ink) of nozzles and flow channels with foreign matter is prevented to ensure stable ejection.

Thus, the ink jet textile printing method using the ink set of the second embodiment can improve the quality (color developability, hue of black) of black images and adjust the color tone of the black images while preventing clogging and ejection failure.

4. Examples

The above-described embodiments of the invention will now be further described in detail with reference to Examples and Comparative Examples. However, the invention is not limited to the Examples disclosed below.

4.1. Evaluation of Ink Jet Textile Printing Ink Compositions

4.1.1. Preparation of Ink Jet Textile Printing Ink Compositions

The reactive dyes, the water-soluble solvents and the surfactant that are shown in Table 1 were mixed, and ion exchanged water was further added to the mixture so that the total mass would be 100% by mass. After being sufficiently stirred, the mixture was filtered through a membrane filter of 5.0 μm in pore size. Thus, each of the ink compositions shown in Table 1 was prepared.

4.1.2. Test for Evaluation

Recovery from Clogging

The ink composition prepared above was introduced into all lines of a head of an ink jet printer (PX-G930, manufactured by Seiko Epson Corporation), and it was ensured that the ink composition was normally ejected from all the lines. Then, the print head was allowed to stand in an environment of 40° C. and 20% RH for 3 days in a state where the head stayed at a position in the printing region away from the standby position. After being allowed to stand, the print head was returned to the standby position and subjected to cleaning, and the number of times of cleaning until normal ejection of the ink composition was recovered was counted. Evaluation criteria are as follows, and the results are shown in Table 1.

Criteria

A: All the nozzles recovered by cleaning once or less.
B: All the nozzles recovered by cleaning twice to three times.
C: All the nozzles recovered by cleaning four times to six times.
D: The nozzles did not recover even by cleaning six times.

Ejection Stability

Each of the ink compositions prepared above was introduced into an ink cartridge for an ink jet textile printing machine Monna-Lisa (ML180 T16) (manufactured by Fratelli Robustelli S.r.l), and the ink cartridge was allowed to stand at 60° C. for 7 days. After being allowed to stand, the ink cartridge was mounted to Monna-Lisa (ML180 T16) and a solid pattern (720 dpi×720 dpi in 100% ejection, normal mode) was printed. The resulting pattern was checked for nozzle fault (ejection failure). Evaluation criteria are as follows, and the results are shown in Table 1.

Criteria

A: No nozzle fault occurred even though 300 m of the pattern was printed.
B: More than 0% to 1% of all the nozzles failed ejection when 300 m of the pattern was printed.
C: More than 1% to 3% of all the nozzles failed ejection when 300 m of the pattern was printed.
D: More than 3% of all the nozzles failed ejection when 300 m of the pattern was printed.

The head subjected to the above test was removed, and the nozzles were visually observed after the flow channels of the head were washed with pure water. Evaluation criteria are as follows, and the results are shown in Table 1.

Criteria

Good: No foreign matter was observed.
Bad: Foreign matter was observed.

Color Development

Each of the ink compositions prepared above was introduced into an ink jet textile printing machine Monna-Lisa (ML180 T16) (manufactured by Fratelli Robustelli S.r.l), and a solid pattern (720 dpi×720 dpi in 100% ejection, normal mode). The printed fabric was subjected to post-treatment under the conditions below. The optical density (OD) of the resulting printed fabric was measured. The results are shown in Table 1.

Fabric to be Printed
  Cotton: COT-PTR (manufactured by FOR. TEX S.r.l, cotton fabric for reactive ink, pretreated)
  Silk: SK-PTR (manufactured by FOR. TEX S.r.l, silk fabric for reactive ink, pretreated)

Post-Treatment Conditions
  Cotton: steam treatment (102° C. for 12 minutes)+hot water rinsing for 10 minutes+cold water rinsing for 10 minutes
  Silk: steam treatment (102° C. for 20 minutes)+70° C. water rinsing for 15 minutes+cold water rinsing for 10 minutes Color Measurement
  Spectrolino (spectroscopic densitometer, manufactured by X-rite Inc.), light source: D65, status: DIN_NB, view angle: 2 degrees, filter: UV 4.1.3. Test Results The constitution and test results of the ink jet textile printing ink compositions are shown in Table 1. The values of the ink compositions in Table 1 are represented on a percent-by-mass basis.

TABLE 1

| Type of ingredient | Name of ingredient | Example 1 | Example 2 | Example 3 | Example 4 | Example 5 | Example 6 | Example 7 |
|---|---|---|---|---|---|---|---|---|
| Reactive dye | C.I. Reactive Black 39 (Na salt) | 9.6 | 14.9 | 14.3 | 4.5 | 10.79 | 7.2 | 10.5 |
| | Dye of formula (4) (Li salt) | 2.4 | 1.6 | 2.2 | 7.5 | 1.21 | 9.3 | 6 |
| | Dye of formula (5) (K salt) | | | | | | | |
| | Dye of formula (6) ($NH_4$ salt) | | | | | | | |
| | C.I. Reactive Orange 12 (Na salt) | 1.5 | | | | 1.5 | | |
| | C.I. Reactive Orange 13 (Na salt) | 1.5 | | | 2 | 1.5 | | |
| | C.I. Reactive Red 3:1 (Na salt) | 1.5 | | | | | | |
| | C.I. Reactive Red 24 (Na salt) | | | | | 1.5 | | |
| | C.I. Reactive Red 245 (Na salt) | | | | 2.5 | | | |
| Water-soluble solvent | Propylene glycol | 5 | 5 | 5 | 5 | 5 | 5 | 5 |
| | 1,2-Hexanediol | 3 | 2 | 2 | | 2 | | |
| | Triethylene glycol monobutyl ether | | 1 | 1 | 3 | 1 | 3 | 3 |
| | 2-Pyrrolidone | 5 | 5 | 5 | 5 | 5 | 5 | 5 |
| Moisture inducing agent | Urea | 3 | 3 | 3 | 2 | 3 | 2 | 2 |
| pH adjuster | Isopropanolamine | | 0.1 | 0.1 | | 0.1 | | |
| Buffer | BES | 0.5 | 0.5 | 0.5 | 0.5 | 0.5 | 0.5 | 0.5 |
| Surfactant | Olfine PD002W | 0.1 | 0.1 | 0.1 | 0.1 | 0.1 | 0.1 | 0.1 |
| Water | Ion exchanged water | Balance | Balance | Balance | Balance | Balance | Balance | Balance |
| | Total | 100 | 100 | 100 | 100 | 100 | 100 | 100 |
| | Mole ratio of $Na^+$ to $Li^+$ in ink | 5:1 | 8.6:1 | 8.6:1 | 1:1 | 11:1 | 0.7:1 | 0.7:1 |
| | Mole ratio of compound of formula (1) to $Li^+$ in ink | 1:1.1 | 1:0.5 | 1:0.7 | 1:3.2 | 1:0.5 | 1:2.9 | 1:1.9 |

TABLE 1-continued

| Test result | Recovery from clogging | | A | B | B | A | C | A | A |
|---|---|---|---|---|---|---|---|---|---|
| | Ejection stability | Printing | A | A | A | B | A | C | C |
| | | Nozzle observation | Good | Good | Good | Good | Good | Good | Good |
| | Color development | Cotton | 1.65 | 1.65 | 1.65 | 1.66 | 1.65 | 1.66 | 1.66 |
| | | Silk | 1.56 | 1.55 | 1.55 | 1.57 | 1.53 | 1.57 | 1.57 |

| Type of ingredient | Name of ingredient | Comparative Example 1 | Comparative Example 2 | Comparative Example 3 | Comparative Example 4 |
|---|---|---|---|---|---|
| Reactive dye | C.I. Reactive Black 39 (Na salt) | 12 | | 9.2 | 4.2 |
| | Dye of formula (4) (Li salt) | | 16.5 | | |
| | Dye of formula (5) (K salt) | | | 2.8 | |
| | Dye of formula (6) (NH$_4$ salt) | | | | 7.8 |
| | C.I. Reactive Orange 12 (Na salt) | 1.5 | | 1.5 | |
| | C.I. Reactive Orange 13 (Na salt) | 1.5 | | 1.5 | 2 |
| | C.I. Reactive Red 3:1 (Na salt) | | | | |
| | C.I. Reactive Red 24 (Na salt) | 1.5 | | 1.5 | |
| | C.I. Reactive Red 245 (Na salt) | | | | 2.5 |
| Water-soluble solvent | Propylene glycol | 5 | 5 | 5 | 5 |
| | 1,2-Hexanediol | 2 | 2 | 2 | |
| | Triethylene glycol monobutyl ether | 1 | 1 | 1 | 3 |
| | 2-Pyrrolidone | 5 | 5 | 5 | 5 |
| Moisture inducing agent | Urea | 3 | 3 | 3 | 2 |
| pH adjuster | Isopropanolamine | 0.1 | 0.1 | 0.1 | |
| Buffer | BES | 0.5 | 0.5 | 0.5 | 0.5 |
| Surfactant | Olfine PD002W | 0.1 | 0.1 | 0.1 | 0.1 |
| Water | Ion exchanged water | Balance | Balance | Balance | Balance |
| | Total | 100 | 100 | 100 | 100 |
| | Mole ratio of Na$^+$ to Li$^+$ in ink | — | — | 4.9:1(*3) | 1:1(*4) |
| | Mole ratio of compound of formula (1) to Li$^+$ in ink | — | 1:5 | — | — |
| Test result | Recovery from clogging | D | A | D | D |
| | Ejection stability Printing | A | D | D | A |
| | Nozzle observation | Good | Bad(*1) | Bad(*2) | Good |
| | Color development Cotton | 1.65 | 1.66 | 1.63 | 1.65 |
| | Silk | 1.53 | 1.58 | 1.51 | 1.54 |

(*1)Crystalline foreign matter (lithium stearate);
(*2)Dye aggregate;
(*3)Mole ratio of Na$^+$ to K$^+$ in ink;
(*4)Mole ratio of Na$^+$ to NH$_4^+$ in ink Supplementary explanation is given to the ingredients shown in Table 1 as follows:

C.I. Reactive Black 39: compound represented by the following formula (3), compound of formula (1) in which all the counter ions are Na$^+$.

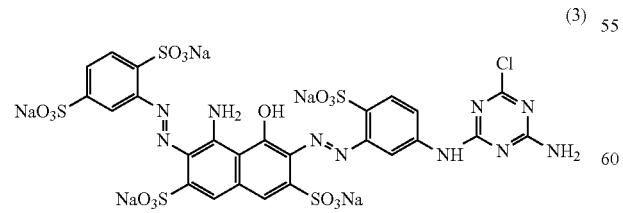

(3)

Dye of formula (4): compound of formula (1) in which all the counter ions are Li$^+$.

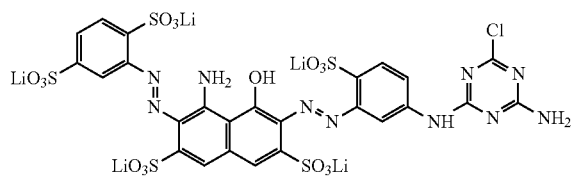

(4)

Dye of formula (5): compound of formula (1) in which all the counter ions are K$^+$.

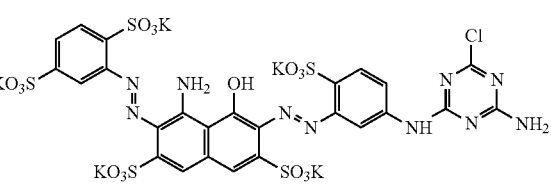

(5)

Dye of formula (6): compound of formula (1) in which all the counter ions are NH$_4^+$.

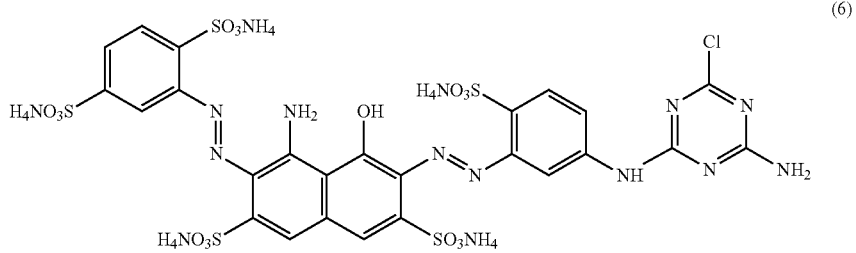

(6)

BES: N,N-bis(2-hydroxyethyl)-2-aminoethanesulfonic acid

Olfine PD002W: product name, nonionic surfactant, produced by Nissin Chemical Industry Co., Ltd The ink compositions of Examples 1 to 7 produced good color development on cotton and silk and, in addition, exhibited good recovery from clogging and satisfactory ejection stability.

Also, since the combined use of $Na^+$ and $Li^+$ considerably increases the water solubility of the compound of formula (1), the compound fixed to the nozzles or the like can be easily redissolved in water. It is assumed that this is the reason why recovery from clogging was good. Furthermore, the combination of $Na^+$ and $Li^+$ prevented the clogging (failure to supply ink) of the nozzles and flow channels with foreign matter and thus ensured stable ejection.

On the other hand, in the use of the ink composition of Comparative Example 1, which did not contain $Li^+$, the nozzles did not recover easily from clogging because the water solubility of the compound of formula (1) was not improved. The ink composition of Comparative Example 2, which did not contain $Na^+$, attacked the materials of the cartridge and flow channels of the printer when came in contact therewith, consequently producing foreign matter of lithium stearate that degraded ejection stability. In the use of the ink composition of Comparative Example 3, which contained $K^+$, but not $Li^+$, the nozzles did not recover easily from clogging and, in addition, the dyes formed aggregates that degraded ejection stability, because the water solubility of the compound of formula (1) was not improved. In the use of the ink composition of Comparative Example 4, which contained $NH_4^+$, but not $Li^+$, the nozzles did not recover easily from clogging because the water solubility of the compound of formula (1) was not improved.

4.2. Evaluation (1) of Ink Sets

4.2.1. Preparation of Ink Sets

The reactive dyes, the water-soluble solvents and the surfactant that are shown in Table 2 were mixed, and ion exchanged water was further added to the mixture so that the total mass would be 100% by mass. After being sufficiently stirred, the mixture was filtered through a membrane filter of 5.0 µm in pore size. Thus, deep black inks (K-1, K-2, and K-3) and pale black inks (LK-1, LK-2, LK-3, and LK-4) were prepared as shown in Table 2. Subsequently, each combination of one of the deep black inks and one of the pale black inks was created as shown in Table 3, and thus ink sets 1 to 10 were prepared.

4.2.2. Test for Evaluation

Recovery from Clogging

In each ink set shown in Table 3, the deep black ink was introduced to the first, the third, the fifth and the seventh lines from the left of the printing lines of an ink jet printer (PX-G930, manufactured by Seiko Epson Corporation), and the pale black ink was introduced to the second, the fourth, the sixth and the eighth lines from the left of the printing lines. After ensuring that the inks were normally ejected from all the lines, the print head was allowed to stand in an environment of 40° C. and 20% RH for 3 days in a state where the head stayed at a position in the printing region away from the standby position. After being allowed to stand, the print head was returned to the standby position and subjected to cleaning. The number of times of cleaning until normal ejection from the four lines charged with the deep black ink was recovered was counted. The four lines charged with the pale black ink were also tested in the same manner. Evaluation criteria are as follows, and the results are shown in Table 3.

Criteria

A: All the nozzles recovered by cleaning once or less.

B: All the nozzles recovered by cleaning twice to three times.

C: All the nozzles recovered by cleaning four times to six times.

D: The nozzles did not recover even by cleaning six times.

4.2.3. Test Results

The constitutions of the deep black inks and the pale black inks are shown in Table 2 below. The combinations of the ink sets and the recovery test results of the ink sets are shown in Table 3 below. The values of the ink compositions in Table 2 are represented on a percent-by-mass basis, and the supplementary description of the ingredients in Table 1 applies to this case.

TABLE 2

| Type of ingredient | Name of ingredient | Deep black ink (Black) | | | Pale black ink (Gray) | | | |
|---|---|---|---|---|---|---|---|---|
| | | K-1 | K-2 | K-3 | LK-1 | LK-2 | LK-3 | LK-4 |
| Reactive dye | C.I. Reactive Black 39 (Na salt) | 9.6 | 14.9 | 12 | 2 | 1.61 | | 1.3 |
| | Dye of formula (4) (Li salt) | 2.4 | 1.6 | | | 0.39 | | 1.7 |
| | C.I. Reactive Black 8 (Na salt) | | | | | | 3 | |

TABLE 2-continued

|  |  | Deep black ink (Black) | | | Pale black ink (Gray) | | | |
| --- | --- | --- | --- | --- | --- | --- | --- | --- |
| Type of ingredient | Name of ingredient | K-1 | K-2 | K-3 | LK-1 | LK-2 | LK-3 | LK-4 |
|  | C.I. Reactive Orange 12 (Na salt) | 1.5 |  | 1.5 | 0.3 | 0.21 |  |  |
|  | C.I. Reactive Orange 13 (Na salt) | 1.5 |  | 1.5 | 0.3 | 0.21 |  |  |
|  | C.I. Reactive Red 3:1 (Na salt) | 1.5 |  |  | 0.3 | 0.21 |  |  |
|  | C.I. Reactive Red 24 (Na salt) |  |  | 1.5 |  |  |  |  |
| Water-soluble solvent | Propylene glycol | 5 | 5 | 5 | 15 | 15 | 15 | 5 |
|  | 1,2-Hexanediol | 3 | 2 | 2 | 2 | 3 | 2 | 2 |
|  | Triethylene glycol monobutyl ether |  | 1 | 1 | 1 |  | 1 | 1 |
|  | 2-Pyrrolidone | 5 | 5 | 5 | 5 | 5 | 5 | 5 |
| Moisture inducing agent | Urea | 3 | 3 | 3 | 3 | 3 | 3 | 3 |
| pH adjuster | Isopropanolamine |  | 0.1 | 0.1 | 0.1 |  | 0.1 | 0.1 |
| Buffer | BES | 0.5 | 0.5 | 0.5 | 0.5 | 0.5 | 0.5 | 0.5 |
| Surfactant | Olfine PD002W | 0.1 | 0.1 | 0.1 | 0.1 | 0.1 | 0.1 | 0.1 |
| Water | Ion exchanged water | Balance | Balance | Balance | Balance | Balance | Balance | Balance |
|  | Total | 100 | 100 | 100 | 100 | 100 | 100 | 100 |
|  | Mole ratio of $Na^+$ to $Li^+$ in ink | 5:1 | 8.6:1 | — | — | 5:1 | — | 0.7:1 |
|  | Mole ratio of compound of formula (1) to $Li^+$ in ink | 1:1.1 | 1:0.5 | — | — | 1:1.04 | — | 1:3 |

TABLE 3

|  |  |  |  | Recovery from clogging in inkset | |
| --- | --- | --- | --- | --- | --- |
|  |  | Deep ink | Pale ink | Deep color | Pale color |
| Example of ink set | Set 1 | K-1 | LK-1 | A | A |
|  | Set 2 | K-1 | LK-3 | A | B |
|  | Set 3 | K-2 | LK-1 | B | A |
|  | Set 4 | K-2 | LK-3 | B | B |
| Comparative Example of ink set | Set 5 | K-3 | LK-1 | D | D |
|  | Set 6 | K-3 | LK-3 | D | D |

By combined use of the first ink jet textile printing ink composition (deep black ink) and the second ink jet textile printing ink composition not containing $Li^+$ (pale black ink), the nozzles can recover from clogging with substantially no difference between the ink compositions. The results shown in Table 3 suggest that the difference in recovery from clogging between the deep black ink and the pale black ink is reduced in an ink jet recording apparatuses such as PX-G930 including a cleaning device with a common cap (suction path).

4.3. Evaluation (2) of Ink Sets

4.3.1. Preparation of Ink Sets

The reactive dyes, the water-soluble solvents and the surfactant that are shown in Table 4 were mixed, and ion exchanged water was further added to the mixture so that the total mass would be 100% by mass. After being sufficiently stirred, the mixture was filtered through a membrane filter of 5.0 μm in pore size. Thus, black inks (K-1 and K-2) shown in Table 2 and magenta inks (M-1, M-2, M-3, M-4, M-5, and M-6) shown in Table 4 were prepared. Subsequently, each combination of one of the black inks and one of the magenta inks was created as shown in Tables 5 and 6, and thus ink sets were prepared.

4.3.2. Test for Evaluation

Color Development

The inks of the ink sets were introduced to an ink jet textile printing machine Monna-Lisa (ML180 T16) (manufactured by Fratelli Robustelli S.r.l), and a black solid pattern was printed for examining the color development of the black solid pattern. The solid pattern included a portion formed with only the black ink (720 dpi×720 dpi at 100% duty, normal mode) and a portion formed by covering a black solid portion (720 dpi×720 dpi at 100% duty, normal mode) with the magenta ink shown in Table 5 or (720 dpi×720 dpi at a duty of 10% to 70%, normal mode). These portions were subjected to post-treatment under the conditions below. The optical density (OD) and hue parameters $a^*$ and $b^*$ of the printed fabric were measured, and ΔOD and chroma $c^*$ were calculated. Evaluation criteria were as below, and the results are shown in Tables 5 and 6.

Fabric to be Printed
 Cotton: COT-PTR (manufactured by FOR. TEX S.r.l, cotton fabric for reactive ink, pretreated)
 Silk: SK-PTR (manufactured by FOR. TEX S.r.l, silk fabric for reactive ink, pretreated)
Post-Treatment Conditions
 Cotton: steam treatment (102° C. for 12 minutes)+hot water rinsing for 10 minutes+cold water rinsing for 10 minutes
 Silk: steam treatment (102° C. for 20 minutes)+70° C. water rinsing for 15 minutes+cold water rinsing for 10 minutes Color measurement
 Spectrolino (spectroscopic densitometer, manufactured by X-rite Inc.), light source: D65, status: DIN_NB, view angle: 2 degrees, filter: UV
 ΔOD represents the difference in optical density from the case of using only the black ink.
 Chroma $c^*$ is calculated by using equation $c^* = ((a^*)^2 + (b^*)^2)^{1/2}$.
 $a^*$ and $b^*$ represent parameters of perceived chromaticity specified by the CIELAB space.
Criteria
 A: On both the cotton fabric and the silk fabric, ΔOD was 0.05 or more increased and $c^*$ was 5 or less.
 B: On both the cotton fabric and the silk fabric, ΔOD was 0.03 or more increased and $c^*$ was 7 or less.
 C: On both the cotton and the silk, ΔOD was 0.03 or more increased and $c^*$ was 10 or less.
 D: On at least one of the cotton fabric and the silk fabric, ΔOD was lower than 0.03, or $c^*$ was higher than 10.

4.3.3. Test Results

The constitutions of the black inks and the magenta inks are shown in Table 2 and Table 4, respectively. The combinations of the ink sets, the printing conditions, and color developability test results are shown in Tables 5 and below. The values of the ink compositions in the following Table 4 are represented on a percent-by-mass basis, and the supplementary description of the ingredients in Table 1 applies to this case.

TABLE 4

| Type of ingredient | Name of ingredient | Magenta ink | | | | | |
| --- | --- | --- | --- | --- | --- | --- | --- |
| | | M-1 | M-2 | M-3 | M-4 | M-5 | M-6 |
| Reactive dye | C.I. Reactive Orange 12 (Na salt) | 10 | | | | | |
| | C.I. Reactive Orange 13 (Na salt) | | 10 | | | | |
| | C.I. Reactive Red 3:1 (Na salt) | | | 10 | | | |
| | C.I. Reactive Red 24 (Na salt) | | | | 10 | | |
| | C.I. Reactive Red 245 (Na salt) | | | | | 10 | |
| | C.I. Reactive Red 24:1 (Na salt) | | | | | | 10 |
| Water-soluble solvent | Propylene glycol | 5 | 5 | 5 | 5 | 5 | 5 |
| | 1,2-Hexanediol | 3 | 3 | 3 | 3 | 3 | 3 |
| | 2-Pyrrolidone | 5 | 5 | 5 | 5 | 5 | 5 |
| Moisture inducing agent | Urea | 3 | 3 | 3 | 3 | 3 | 3 |
| pH adjuster | Isopropanolamine | 0.1 | 0.1 | 0.1 | 0.1 | 0.1 | 0.1 |
| Buffer | BES | 0.5 | 0.5 | 0.5 | 0.5 | 0.5 | 0.5 |
| Surfactant | Olfine PD002W | 0.1 | 0.1 | 0.1 | 0.1 | 0.1 | 0.1 |
| Water | Ion exchanged water | Balance | Balance | Balance | Balance | Balance | Balance |
| | Total | 100 | 100 | 100 | 100 | 100 | 100 |

TABLE 5

| | Black | | Magenta | | Solids ratio | | Color development | | | | Black hue | | | | |
| --- | --- | --- | --- | --- | --- | --- | --- | --- | --- | --- | --- | --- | --- | --- | --- |
| | | | | | | | OD | | ΔOD | | Hue a* | | Chroma c* | | |
| | Ink | Duty | Ink | Duty | Bk:M | M/Bk | Cotton | Silk | Cotton | Silk | Cotton | Silk | Cotton | Silk | Rating |
| Example | K-1 | 100% | M-1 | 20% | 12.0:6.5 | 0.54 | 1.70 | 1.61 | 0.05 | 0.05 | 0.5 | 1.2 | 5 | 5 | A |
| | K-1 | 100% | M-2 | 20% | 12.0:6.5 | 0.54 | 1.70 | 1.61 | 0.05 | 0.05 | 0.5 | 1.2 | 5 | 5 | A |
| | K-1 | 100% | M-3 | 20% | 12.0:6.5 | 0.54 | 1.70 | 1.61 | 0.05 | 0.05 | 0.6 | 1.3 | 5 | 5 | A |
| | K-1 | 100% | M-4 | 20% | 12.0:6.5 | 0.54 | 1.70 | 1.61 | 0.05 | 0.05 | 0.6 | 1.3 | 5 | 5 | A |
| | K-2 | 100% | M-1 | 20% | 16.5:2.0 | 0.12 | 1.68 | 1.58 | 0.03 | 0.03 | −2.2 | −1.4 | 7 | 7 | B |
| | K-2 | 100% | M-2 | 20% | 16.5:2.0 | 0.12 | 1.68 | 1.59 | 0.03 | 0.04 | −2.1 | −1.4 | 7 | 7 | B |
| | K-2 | 100% | M-3 | 20% | 16.5:2.0 | 0.12 | 1.70 | 1.59 | 0.05 | 0.04 | −2.0 | −1.3 | 7 | 7 | B |
| | K-2 | 100% | M-4 | 20% | 16.5:2.0 | 0.12 | 1.68 | 1.58 | 0.03 | 0.03 | −2.1 | −1.4 | 7 | 7 | B |
| Comparative Example | K-1 | 100% | — | — | 12.0:4.5 | 0.38 | 1.65 | 1.56 | 0.00 | 0.00 | −4.5 | −5.1 | 15 | 20 | D |
| | K-2 | 100% | — | — | 16.5:0.0 | 0.00 | 1.65 | 1.55 | 0.00 | 0.00 | −10.0 | −11.0 | 20 | 25 | D |
| | K-2 | 100% | M-6 | 20% | 16.5:2.0 | 0.12 | 1.66 | 1.57 | 0.01 | 0.02 | −4.3 | −4.9 | 15 | 20 | D |

TABLE 6

| | Black | | Magenta | | Solids ratio | | Color development | | | | Black hue | | | | |
| --- | --- | --- | --- | --- | --- | --- | --- | --- | --- | --- | --- | --- | --- | --- | --- |
| | | | | | | | OD | | ΔOD | | Hue a* | | Chroma c* | | |
| | Ink | Duty | Ink | Duty | Bk:M | M/Bk | Cotton | Silk | Cotton | Silk | Cotton | Silk | Cotton | Silk | Rating |
| Example | K-1 | 100% | M-5 | 10% | 12.0:5.5 | 0.46 | 1.70 | 1.61 | 0.05 | 0.05 | 0.4 | 1.2 | 4 | 4 | A |
| | K-1 | 100% | M-5 | 20% | 12.0:6.5 | 0.54 | 1.70 | 1.61 | 0.05 | 0.05 | 0.7 | 1.5 | 5 | 5 | A |
| | K-1 | 100% | M-5 | 30% | 12.0:7.5 | 0.63 | 1.70 | 1.59 | 0.05 | 0.03 | 1.0 | 1.7 | 6 | 6 | B |
| | K-1 | 100% | M-5 | 40% | 12.0:8.5 | 0.71 | 1.69 | 1.59 | 0.04 | 0.03 | 1.3 | 1.9 | 7 | 7 | B |
| | K-1 | 100% | M-5 | 50% | 12.0:9.5 | 0.79 | 1.68 | 1.59 | 0.03 | 0.03 | 1.5 | 2.2 | 7 | 7 | B |
| | K-1 | 100% | M-5 | 60% | 12.0:10.5 | 0.88 | 1.68 | 1.59 | 0.03 | 0.03 | 1.7 | 2.3 | 8 | 8 | C |
| | K-1 | 100% | M-5 | 70% | 12.0:11.5 | 0.96 | 1.68 | 1.59 | 0.03 | 0.03 | 1.9 | 2.5 | 9 | 9 | C |
| | K-2 | 100% | M-5 | 10% | 16.5:1.0 | 0.06 | 1.70 | 1.60 | 0.05 | 0.05 | −2.8 | −2.2 | 10 | 9 | C |
| | K-2 | 100% | M-5 | 20% | 16.5:2.0 | 0.12 | 1.71 | 1.61 | 0.06 | 0.06 | −2.5 | −2.1 | 9 | 8 | C |
| | K-2 | 100% | M-5 | 30% | 16.5:3.0 | 0.18 | 1.71 | 1.61 | 0.06 | 0.06 | −2.2 | −2.0 | 8 | 7 | C |
| | K-2 | 100% | M-5 | 40% | 16.5:4.0 | 0.24 | 1.71 | 1.61 | 0.06 | 0.06 | −1.9 | −1.9 | 6 | 6 | B |
| | K-2 | 100% | M-5 | 50% | 16.5:5.0 | 0.30 | 1.72 | 1.62 | 0.07 | 0.07 | −1.6 | −1.8 | 5 | 5 | A |
| | K-2 | 100% | M-5 | 60% | 16.5:6.0 | 0.36 | 1.72 | 1.62 | 0.07 | 0.07 | −1.3 | −1.6 | 5 | 4 | A |
| | K-2 | 100% | M-5 | 70% | 16.5:7.0 | 0.42 | 1.73 | 1.62 | 0.08 | 0.07 | −1.0 | −1.4 | 5 | 4 | A |

The test results using the ink sets prepared above suggest that by printing a magenta ink containing a coloring material capable of adjusting the hue in an a* direction so as to cover black ink K-1 or K-2, the color development of the black solid portion can be increased.

The invention is not limited to the above-described embodiments and Examples, and various modifications may be made. For example, the invention includes substantially the same form as the disclosed embodiments (for example, a form including the same function and method and producing the same result, or a form having the same intent and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

This application claims priority to Japanese Patent Application Nos. 2016-060187 filed on Mar. 24, 2016 and 2016-169222 filed on Aug. 31, 2016. The entire disclosures of Japanese Patent Application Nos. 2016-060187 and 2016-169222 are hereby incorporated herein by reference.

What is claimed is:

1. An ink jet textile printing ink composition comprising: a compound represented by formula (1):

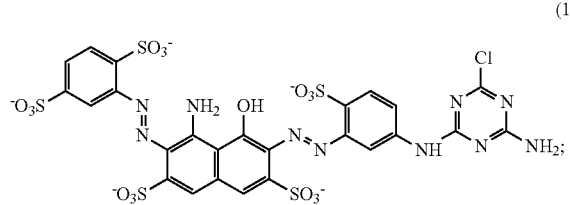

(1)

$Li^+$; and
$Na^+$,
wherein the mole ratio of the compound represented by formula (1) to the $Li^+$ is in the range of 1:0.4 to 1:3.5.

2. The ink jet textile printing ink composition according to claim 1, wherein the compound is represented by the following general formula (2):

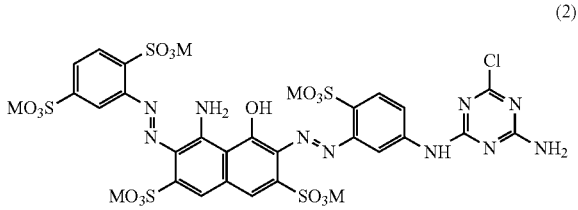

(2)

where each M represents a counter ion that is one of $Na^+$ and $Li^+$, and at least one of the five M's represents $Li^+$.

3. The ink jet textile printing ink composition according to claim 1, wherein the content of the compound represented by formula (1) or a salt thereof is 10% by mass or more relative to the total mass of the ink composition.

4. An ink set comprising:
a first ink jet textile printing ink composition that is the ink jet textile printing ink composition as set forth in claim 1, and
a second ink jet textile printing ink composition containing no $Li^+$.

5. An ink set comprising:
a first ink jet textile printing ink composition that is the ink jet textile printing ink composition as set forth in claim 2, and
a second ink jet textile printing ink composition containing no $Li^+$.

6. An ink set comprising:
a first ink jet textile printing ink composition that is the ink jet textile printing ink composition as set forth in claim 3, and
a second ink jet textile printing ink composition containing no $Li^+$.

7. An ink set comprising:
a first ink jet textile printing ink composition that is the ink jet textile printing ink composition as set forth in claim 1, and
a third ink jet textile printing ink composition containing a coloring material capable of adjusting the hue of the first ink composition.

8. An ink set comprising:
a first ink jet textile printing ink composition that is the ink jet textile printing ink composition as set forth in claim 2, and
a third ink jet textile printing ink composition containing a coloring material capable of adjusting the hue of the first ink composition.

9. An ink set comprising:
a first ink jet textile printing ink composition that is the ink jet textile printing ink composition as set forth in claim 3, and
a third ink jet textile printing ink composition containing a coloring material capable of adjusting the hue of the first ink composition.

10. The ink set according to claim 7, wherein the coloring material is at least one selected from the group consisting of C.I. Reactive Orange 12, C.I. Reactive Orange 13, C.I. Reactive Red 3:1, C.I. Reactive Red 24, and C.I. Reactive Red 245.

11. A printing method comprising:
printing, using a black color, a fabric with the ink set as set forth in claim 7 so that the proportion of the coloring material capable of adjusting the hue to a black dye is in the range of 0.2 to 0.8 in terms of solids content.

12. A printing method comprising:
printing, using a black color, a fabric with the ink set as set forth in claim 10 so that the proportion of the coloring material capable of adjusting the hue to a black dye is in the range of 0.2 to 0.8 in terms of solids content.

* * * * *